(12) United States Patent
Horst et al.

(10) Patent No.: US 6,354,321 B1
(45) Date of Patent: Mar. 12, 2002

(54) STORAGE CONTAINER FOR CRYOGENIC LIQUIDS

(75) Inventors: Rüdiger Horst, Augsburg; Sillat Diethard, Martinsried, both of (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 09/377,684

(22) Filed: Aug. 20, 1999

(30) Foreign Application Priority Data

Aug. 20, 1998 (DE) ........................................ 198 37 886

(51) Int. Cl.⁷ .............................................. B65D 90/08
(52) U.S. Cl. .................... 137/255; 137/259; 220/560.1; 220/901
(58) Field of Search ................................ 137/255, 256, 137/259, 264, 265; 220/565, 564, 532, 529, 560.1, 560.04, 560.12, 560.09, 901

(56) References Cited

U.S. PATENT DOCUMENTS 2,341,547 A    2/1944   Heineman
2,600,015 A    6/1952   McLaughlin
3,481,505 A  * 12/1969  Nason et al. ........ 220/560.1 X
4,098,425 A  *  7/1978  Yamamoto .............. 220/901 X
5,787,920 A  *  8/1998  Krasnov ..................... 137/255

FOREIGN PATENT DOCUMENTS

DE    1 160 455    1/1964
DE    1 946 410    3/1970
DE    29 31 947    2/1981
DE    44 13 816   10/1995
DE   195 24 681    1/1997
EP    0 091 177   10/1983

* cited by examiner

Primary Examiner—Kevin Lee
(74) Attorney, Agent, or Firm—Millen, White, Zelano & Branigan, P.C.

(57) ABSTRACT

The invention relates to a storage container, especially for cryogenic liquids, with an inside container (1) and an outside container (2), whereby an insulation space (3) is located between inside container (1) and outside container (2). To increase the stability of inside container (1) and/or outside container (2), at least one support (4, 10) is provided, which does not produce any heat-conducting connection between inside container (1) and outside container (2).

23 Claims, 1 Drawing Sheet

STORAGE CONTAINER FOR CRYOGENIC LIQUIDS

FIELD OF THE INVENTION

The invention relates to a storage container, especially for cryogenic liquids, with an inside and an outside container, whereby an insulation space is located between the inside and the outside container and whereby at least one support is provided for increasing the stability of the inside container and/or outside container.

BACKGROUND OF THE INVENTION

Industrial gases, such as helium, hydrogen, nitrogen, oxygen or LNG (Liquid Natural Gas), are frequently stored or transported in storage containers in the liquid state. Such storage containers are generally designed with double walls, whereby the liquid gas is stored in the inside container, and the intermediate space between the inside container and the outside container is evacuated so as to form a vacuum for insulation.

Excessive forces act both on the inside container, especially when liquid gas is stored under high pressure, and on the outside container due to the vacuum, which in turn make very large wall thicknesses necessary in the case of a storage container design having flat sides. For this reason, the storage containers were previously designed, in most cases, as cylindrical or spherical shapes.

Hydrogen and LNG are used to an increasing extent as fuels for motor vehicles, boats or aircraft. In this case, storage is preferably carried out in liquid form in the above-described pressurized storage containers with vacuum insulation. The cylindrical design of the container commonly used to date adapts poorly to the vehicle geometry, however. Thus, for example, in the so-called low-cradled buses, an attempt is made to provide a tank arrangement in the upper bus area or on the vehicle roof, whereby the tank is to be amply-sized, but as small as possible.

DE-OS 195 24 681 therefore proposes a storage container for cryogenic media that consists of several individual tubular containers that communicate with one another on the liquid side and that are surrounded by a common outside insulation container that generally does not have any cylindrical symmetry. In this way, it is possible to adapt the tank shape to the motor vehicle geometry by a suitable selection of the individual containers.

Especially in the case of an amply-sized, flat type of design of this storage container, however, precautions must be taken to accommodate the high compressive forces that act on the walls of the outside container. Thus, according to DE-OS 195 24 681, supports are provided for bracing the outside container against the inside container. For these supports, a material having a low thermal conductivity is specifically selected; nevertheless a considerable amount of heat continues to be transferred into the stored cryogenic liquid via these supports.

SUMMARY OF THE INVENTION

An object of this invention is, therefore, to provide a storage container of the type mentioned above, whose geometry can be matched to a large extent to the respective space conditions and requirements, and whereby the introduction of heat into the inside container is reduced.

Upon further study of the specification and appended claims, other objects and advantages of the invention will become apparent.

These objects are attained according to the invention by providing that the support for bracing the outside container are not heat-conducting connections between the inside container(s) and the outside container.

According to the invention, the shape of the outside container (or shell) can be selected at will and thus optimally matched to the space that is provided for the storage container. To take up the liquid that is to be stored, one or more inside containers are provided, whose geometry is essentially independent of that of the outside container. The atmospheric forces that act on the outside container are taken up by bracing supports that are arranged according to the invention such that they do not make any contribution to the heat conduction between the inside and the outside container.

Of course, even in the design according to the invention, positioning supports are necessary to keep the inside container positioned within the outside container. These positioning supports are not, however, designed for bracing against the compressive forces. Consequently, the positioning supports can be relatively thin compared to the bracing supports whereby heat transfer via these positioning supports is negligible.

The positioning supports are in contact either only with the outside container or only the inside container(s). If only one inside container is provided, the positioning supports preferably connect opposing walls of the inside container to offset the tensile forces that are induced by the vacuum that surrounds the inside container. Analogously, the bracing supports that stabilize the outside container preferably run between opposing walls of this container. In the case of several inside containers, the positioning supports can be attached either inside a container or can surround the latter in the form of a stabilizing skeleton or else can advantageously position the inside container vis-a-vis another inside container.

To be able to store a large amount of cryogenic liquid, it is advantageous to match the shape of the inside container to that of the outside container in order to make optimal use of the space available. In this case, however, attention must be directed to the fact that an insulation space remains between the two containers. Generally, supports for the inside and the outside containers must be provided in this case. In this design, the inside container has through-ducts or recesses for the bracing supports of the outside container, so that the bracing supports of the outside container do not come into heat-conducting contact with the inside container.

From a design standpoint, it has proven advantageous to provide not only one but rather several inside containers in a common outside container. In this case, shape and size of the individual inside containers are advantageously matched to the shape of the outside container so as to attain optional use of the volume of the outside container. The use of several inside containers has several advantages. Standard containers, such as, e.g., cylinders, can be used; the geometry of the inside containers can be selected so that the latter tolerate the pressure differences that are present in the storage container without additional supports, and the space that remains free between the individual inside containers is available for guiding the supports for the outside container.

In the case of several inside containers, the latter are preferably connected together on the liquid and/or gas side. In this way, for example, only a single filling level display or only one pressure gauge is necessary for all inside containers.

The inside container or containers has or have preferably a round or elliptical cross-section, since the latter are especially pressure-stable.

The invention has proven its value especially in the storage of liquid hydrogen, liquid oxygen, liquid nitrogen, liquid helium and LNG. The storage container according to the invention is not advantageous, however, only for storing cold media, but also for storing warm or hot media. The invention can always be used advantageously if there is a clear temperature difference between the medium, liquid or gas, that is to be stored. The high adaptability of the storage container to the most varied spaces offered is especially advantageous when using these storage containers in motor vehicles, especially land vehicles.

BRIEF DESCRIPTION OF THE DRAWINGS

The invention as well as further details of the invention are explained in more detail below based on the preferred embodiments that are depicted in the drawings. Here.

DETAILED DISCUSSION OF THE DRAWINGS

Figure 1:
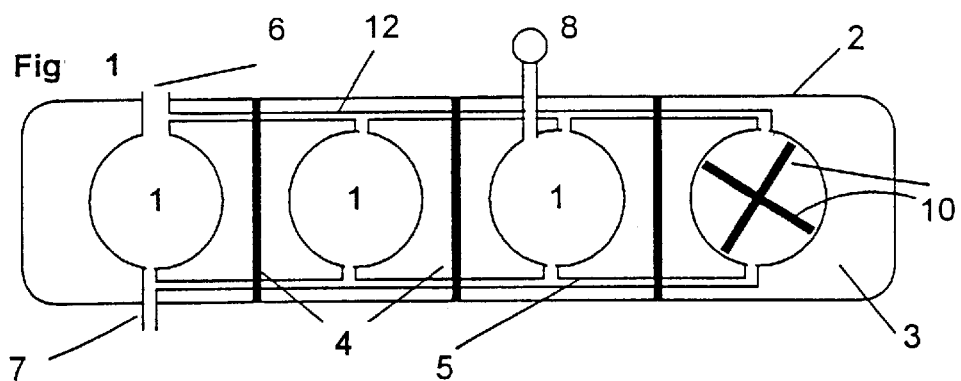
FIG. 1 is a side view of a storage container according to the invention.

FIG. 1 shows a storage container as it can be used in, for example, buses for storage of liquid hydrogen as fuel. The flat shape of the storage container is especially suitable for an arrangement in the upper bus area or on the roof of the bus or generally on vehicle roofs.

The storage container consists of several inside containers 1 and an outside container 2 that surrounds inside container 1. Between inside container 1 and outside container 2 is an insulation space 3, which is generally vacuum-insulated, but can also be filled with perlite or another insulation material. Inside containers 1 are connected below one another on the liquid side via connecting pipes 5 and on the gas side via connecting pipes 12 and provided with a filling line 6 and a drain line 7. Owing to the containers that communicate with one another, only a single filling level display 8 is necessary.

Figure 2:
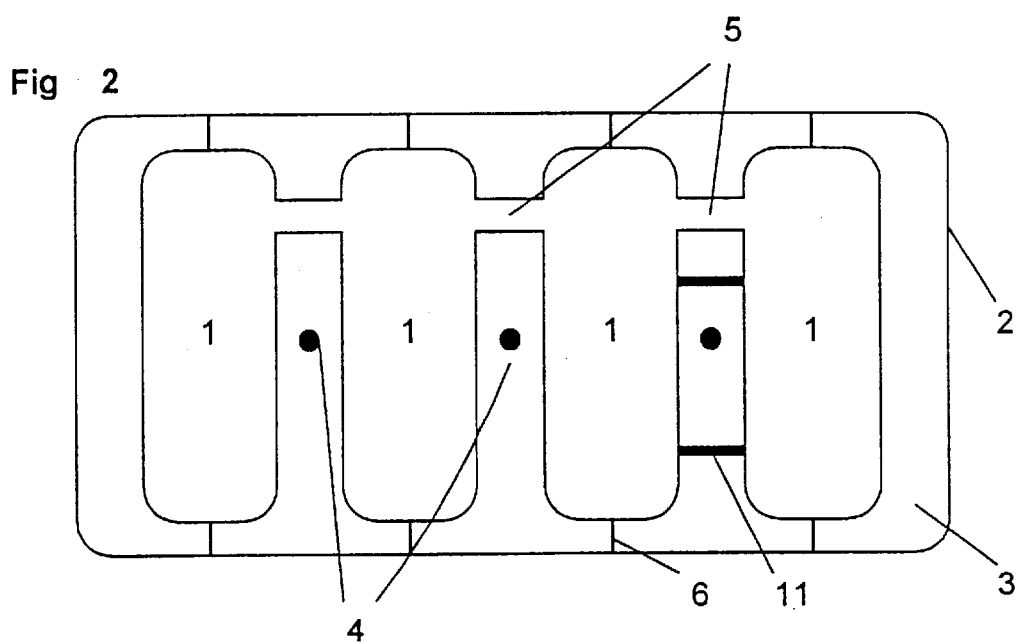
FIG. 2 is a top view of the container of FIG. 1.

Inside containers 1 have a cylindrical geometry and in the case of relatively small wall thicknesses can accommodate the forces that occur owing to the pressure difference between the interior of inside container 1 and insulation space 3. Inside container 1 can however, if this appears necessary, also be stabilized by positioning supports 10 that are attached inside container 1, as indicated in right container 1 in FIG. 1. FIG. 2 shows a positioning of inside containers 1 against one another as an alternative or in addition to this type of stabilization. Positioning supports 11 that are used here brace inside containers 1 below one another, but stabilize neither outside container 2 nor supports 4 that carry outside container 2.

To brace outside container 2, however, bracing supports 4 are necessary. The latter are braced between two opposite walls of outside container 2 and do not have any heat-conducting connection to inside container 1.

FIG. 2 shows the top view of the storage container that is shown in FIG. 1. Supports 4 run in the gaps between inside containers 1 and connect only the warm walls of outside container 2 together. Inside containers 1 are held in position in outside container 2 only by thin, sparingly heat-conducting positioning supports 6, which do not need to accommodate any compressive forces whatsoever.

Figure 3:
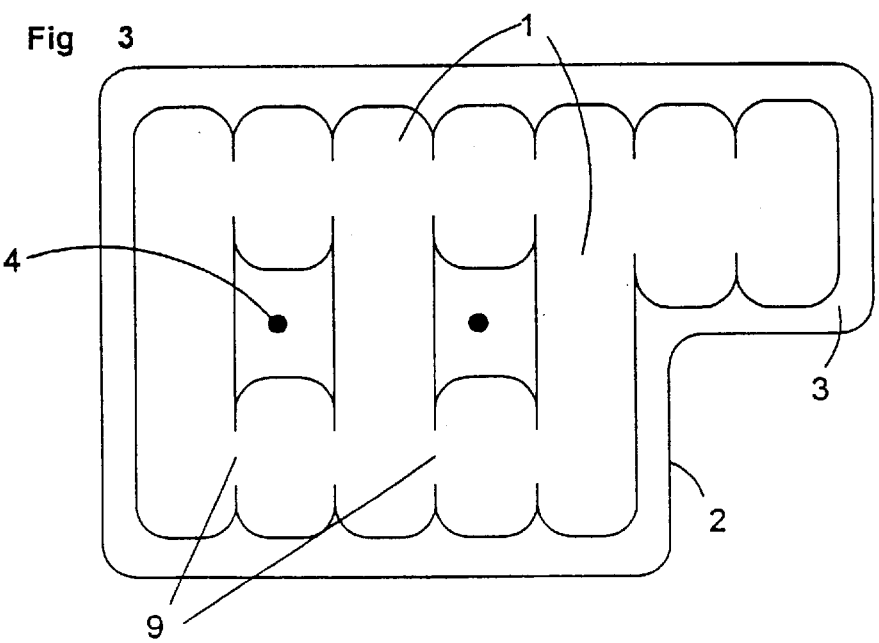
FIG. 3 is a top view of an alternative embodiment of the invention.

In FIG. 3, another configuration of inside containers 1 can be seen. Inside containers 1 that are also designed as cylinders are in this case partially connected with one another, e.g., soldered or welded, on their lengthwise sides, whereby sizes and shapes of inside containers 1 are selected in such a way that as good a matching as possible to outside container 2 is achieved. The liquid that is stored in containers 1 can flow from one container 1 into the next via openings 9, which are located at the contact points of two adjacent inside containers 1. Free spaces through which run supports 4 for bracing outside container 2 are between inside containers 1.

When the storage containers of the invention are to be used for vehicles and in particular for buses, the size of such containers is between 50 and 1000 liters, preferably between 800 and 900 liters. Also, the containers are preferably flat with a rectangular shape and a height of about 400 mm. Preferred materials for the inner container, the outer container and both types of supports are aluminum or stainless steel. The inner container can be filled, e.g. with liquid hydrogen at a pressure of about 12 bar.

The preceding specific embodiments are to be construed as merely illustrative, and not limitative of the remainder of the disclosure in any way whatsoever.

The entire disclosure of all applications, patents and publications, cited above and below, and of corresponding German application 19837886.6, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A storage container, comprising at least one inside container and an outside container having opposing walls, an insulation space located between the inside container and the outside container, and at least one bracing support positioned between said opposing walls of said outside container for increasing the stability of the outside container, wherein said at least one bracing support does not produce any heat-conducting connection between said inside container (1) and said outside container (2).

2. A storage container according to claim 1, further comprising at least one positioning support connecting together walls of said inside container(s) (1).

3. A storage container according to claim 1, further comprising at least one positioning support for preventing movement of said at least one inside container within said outside container.

4. A storage container according to claim 1, wherein more than one inside container (1) is surrounded by said outside container (2).

5. A storage container according to claim 4, wherein the inside containers (1) have different shapes and/or sizes.

6. A storage container according to claim 4, wherein the inside containers (1) are connected to one another via connecting pipes.

7. A storage container according to claim 1, wherein said inside container (1) has a round or elliptical cross-section.

8. A storage container according to claim 1, further comprising a cryogenic liquid within said at least one inside container.

9. A storage container according to claim 2, wherein said at least one positioning support is thin relative to said at least one supports.

10. A storage container according to claim 2, wherein said at least one positioning support is within said inside container.

11. A storage container according to claim 4, further comprising positioning supports connecting together walls of said inside container(s) (1).

12. A storage container, suitable for cryogenic liquids, comprising at least one inside container, an outside container housing said inside container(s) and having opposing walls, an insulation space located between the inside container(s) and the outside container, and at least one bracing support for counteracting atmospheric compressive forces on walls of said outside container when said insulation space comprises a vacuum, said bracing support being positioned between said opposing walls of said outside container and out of structural contact with all said inside container(s), whereby said bracing supports do not conduct heat between any inside container (1) and said outside container (2).

13. A storage container according to claim 12, further comprising at least one positioning support for preventing movement of the inside container(s) within the outside container, said positioning support having a substantially smaller resistance to compressive forces than said bracing support, and being relatively thin in comparison to said bracing support.

14. A storage container according to claim 13, wherein said at least one positioning support connects together walls of said inside container(s) (1).

15. A storage container according to claim 12, wherein said at least one bracing support connects together walls of said outside container (2).

16. A storage container according to claim 13, wherein said at least one bracing support connects together walls of said outside container (2).

17. A storage container according to claim 12, wherein more than one inside container (1) is surrounded by said outside container (2).

18. A storage container according to claim 13, wherein more than one inside container (1) is surrounded by said outside container (2).

19. A storage container according to claim 14, wherein more than one inside container (1) is surrounded by said outside container (2).

20. A storage container according to claim 15, wherein more than one inside container (1) is surrounded by said outside container (2).

21. A storage container according to claim 16, wherein more than one inside container (1) is surrounded by said outside container (2).

22. A storage container according to claim 16, wherein the outside container (2) is rectangular.

23. A storage container according to claim 22, wherein the outside container has a volume of between 50 and 1000 liters.

* * * * *